United States Patent [19]

Banks

[11] 4,112,964
[45] Sep. 12, 1978

[54] LIQUID PROPORTIONER FOR PRESSURE FEED LINE

[76] Inventor: Benjamin W. Banks, P.O. Box 92, Downsville, La. 71234

[21] Appl. No.: 772,814

[22] Filed: Feb. 28, 1977

[51] Int. Cl.$^2$ .............................................. F16K 19/00
[52] U.S. Cl. ................................. 137/205.5; 137/574
[58] Field of Search ............... 137/205.5, 101.11, 268, 137/574; 239/310, 317; 220/22

[56] References Cited

U.S. PATENT DOCUMENTS

| | | | |
|---|---|---|---|
| 1,522,329 | 1/1925 | Salucci | 220/22 X |
| 1,855,323 | 4/1932 | Sirch | 137/205.5 |
| 2,120,608 | 6/1938 | Haering | 137/205.5 |
| 2,153,240 | 4/1939 | Dailey | 239/310 X |
| 2,227,646 | 1/1941 | Hillmann | 137/205.5 X |
| 2,362,607 | 11/1944 | Albertson | 137/205.5 X |

Primary Examiner—Alan Cohan
Attorney, Agent, or Firm—Clarence A. O'Brien; Harvey B. Jacobson

[57] ABSTRACT

A closed hollow pressure container is provided including first and second closed compartments therein. A liquid inlet opens into one of the compartments and a liquid outlet opens outwardly of a lower portion of the second compartment. Gas transfer passage structure is provided communicating the upper portions of the compartments for the transfer of gas under pressure from an upper portion in the first compartment into the upper portion of the second compartment and the container is operatively associated with a liquid pressure flow line including inlet and outlet end portions. The flow line includes flow reducing structure within the line intermediate its inlet and outlet ends and a bleed line communicates the flow line, upstream from the flow reducing structure, with the interior of the first compartment and a restricted flow liquid feed line communicates the lower portion of the second compartment with the flow line downstream from the flow reducing structure. The second compartment may receive liquid medication therein to be proportionally fed therefrom into the flow line by liquid passing from the flow line through the bleed line and into the first compartment and displacing gas from within the upper portion of the first compartment into the upper portion of the second company and thereby building up gas under pressure above the liquid medication within the second compartment for dispensing a proportioned amount of medication into the flow line downstream from the flow reducing structure.

2 Claims, 3 Drawing Figures

LIQUID PROPORTIONER FOR PRESSURE FEED LINE

BACKGROUND OF THE INVENTION

Various forms of liquid proportioners have heretofore been provided for introducing proportioned amounts of various different solutions into a liquid flow. Proportioners of this type are suitable for medication of animals, swine and birds as well as other animals by introducing measured quantities of medication into drinking water. However, many of these liquid proportioners are expensive to produce, difficult to recharge and reliant upon rather extensive maintenance for efficient operation over an extended period of time. Accordingly, a need exists for a simple, durable and dependable liquid proportioner.

Examples of liquid proportioners and other similar devices including some of the general structural and operational features of the instant invention are disclosed in U.S. Pat. Nos. 846,100, 2,064,627, 2,120,608 and 2,670,002.

BRIEF DESCRIPTION OF THE INVENTION

The liquid proportioner of the instant invention comprises an upstanding cylindrical container whose interior is divided into a pair of upstanding side-by-side closed compartments. A gas transfer passage communicates the upper portions of the compartments and a first of the compartments includes a liquid inlet while the second compartment includes a liquid outlet for discharging liquid from a lower portion thereof. A pressurized liquid flow line including inlet and outlet end portions is operatively associated with the container and includes flow reducing structure therein intermediate its inlet and outlet ends. A restricted flow bleed line communicates the flow line, upstream from the flow reducing structure, with the interior of the first compartment and a proportioned liquid feed line communicates the lower portion of the second compartment with the flow line downstream from the flow reducing structure. In this manner, when liquid under pressure passes through the flow line, a portion of the liquid within the flow line passes therefrom into the first compartment, displaces the gas within the first compartment above the liquid therein through the gas transfer passage into the upper portion of the second compartment, and the resultant a build up of gas under pressure over the liquid within the second compartment causes that liquid to be discharged therefrom through the liquid feed line and into the flow line downstream from the flow restricting structure therein.

The main object of this invention is to provide a liquid proportioner which will be dependable in operation.

Another object of this invention is to provide a liquid proportioner of simple construction.

Still another important object of this invention is to provide a liquid proportioner adapted for use in conjunction with various forms of liquid to be proportionately dispensed thereby.

Still another object of this invention is to provide a liquid proportioner which will be operative under varying operating conditions and which will enjoy extended periods of efficient operation independent of extensive maintenance.

A final object of this invention to be specifically enumerated herein is to provide a liquid proportioner in accordance with the preceding objects and which will conform to conventional forms of manufacture, be of simple construction and easy to use, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
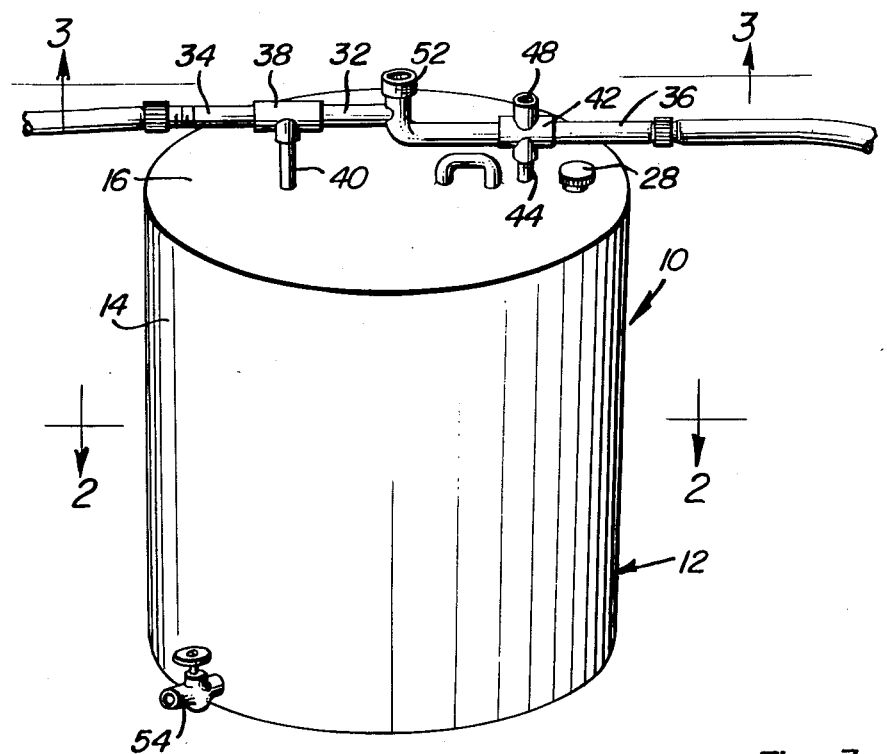
FIG. 1 is a perspective view of the liquid proportioner of the instant invention.
Figure 2:
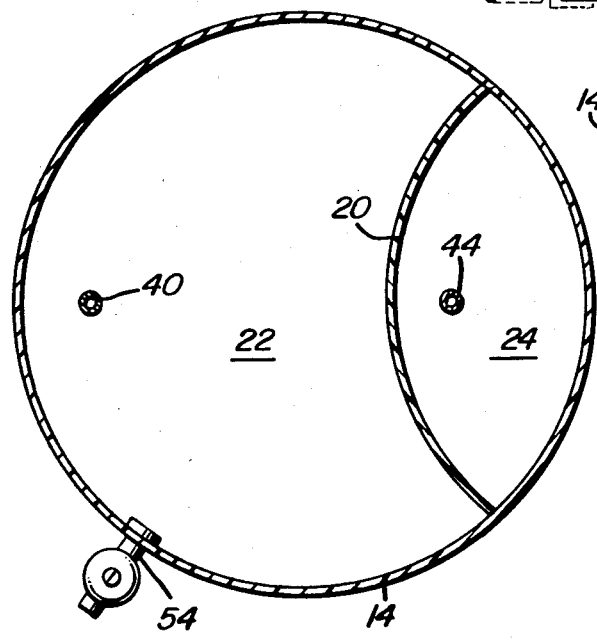
FIG. 2 is an enlarged, fragmentary, horizontal, sectional view taken substantially upon the plane indicated by the section line 2—2 of FIG. 1.
Figure 3:
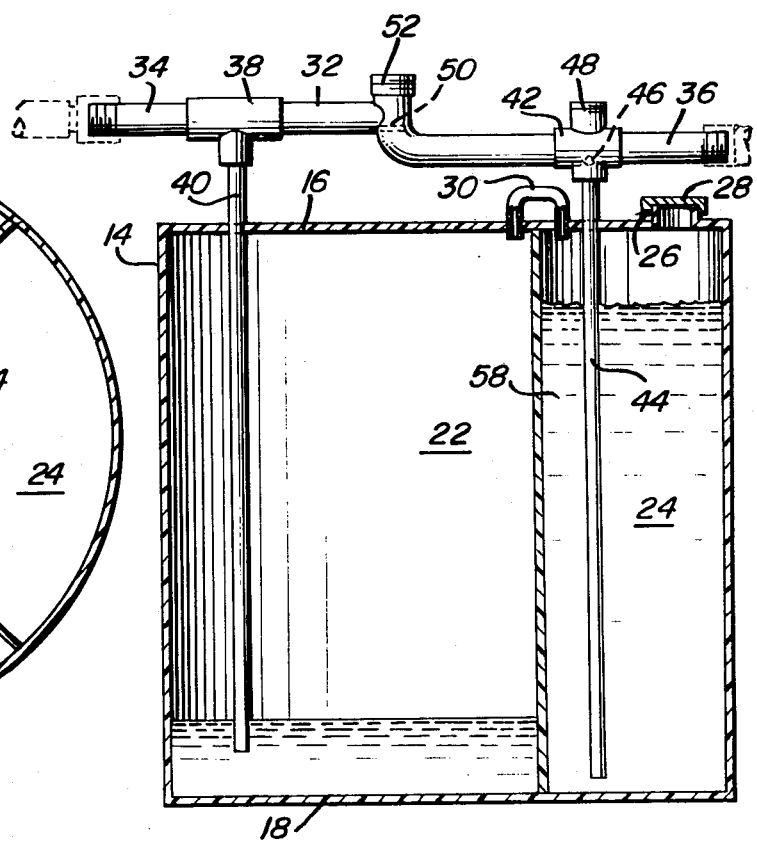
FIG. 3 is a vertical, transverse, sectional view on somewhat of an enlarged scale and taken substantially upon the plane indicated by the section line 3—3 of FIG. 1.

Referring now more specifically to the drawings, the numeral 10 generally designates the liquid proportioner of the instant invention. The proportioner 10 includes an upstanding cylindrical housing referred to in general by the reference numeral 12 including a cylindrical side wall 14 and top and bottom walls 16 and 18 closing the upper and lower ends of the container 12.

An upstanding partial cylindrical partition 20 extends between the top and bottom wells 16 and 18 within the container 12 and divides the interior of the container 12 into first and second large and small closed compartments 22 and 24. The partial cylindrical partition 20 has its convex side opposing those portions of the cylindrical side wall 14 defining the remote side of the compartment 22. The top wall 16 includes an inlet neck 26 through which liquid to be proportionately dispensed may be admitted into the interior of the compartment 24 and the inlet neck 26 is closed in an airtight manner by means of a cap 28.

A gas transfer line 30 communicates the upper extremity of the compartment 22 with the upper extremity of the compartment 24 and a liquid pressure flow line 32 is provided including inlet and outlet end portions 34 and 36. The inlet end portion 34 has a T-fitting 38 connected therein and a restrictive flow bleed line 40 extends from the fitting 38 downwardly through the top wall 16 into the compartment 22 and opens downwardly into the latter adjacent the bottom wall 18, the bleed line 40 passing through the top wall 16 in fluid tight sealed engagement therewith. In addition, the outlet end portion 36 has a T-fitting 42 therein and a proportioned liquid feed line 44 extends from the fitting 42 downwardly through the top wall 16 and into the compartment 24. The feed line 44 also passes through the top wall 16 in fluid tight sealed engagement therewith and opens downwardly within the compartment 24 at a point spaced slightly above the bottom wall 18. The upper outlet end of the flow line 44 is provided with a flow metering orifice 46 of conventional design which may be changed through an upper capped access neck 48 of the fitting 42. In addition, a flow restrictive orifice disk 50 is interposed within the flow line 32 intermediate the fittings 38 and 42 and may be changed through a capped access neck 52 similar to the neck 48. Still further, the lower portion of the container 12 includes a valved drain outlet 54 which opens into the compartment 22 at a point spaced closely above the bottom wall 18.

In operation, a liquid 58 to be dispensed in a proportioned manner into the flow line 32 is placed within the compartment 24 through the neck 26 and the latter is thereafter closed by means of the cap 28. Then, as a pressurized liquid is supplied to the inlet end portion 34 of the flow line 32 and discharged from the outlet end portion 36 of the flow line 32, a portion of the liquid supplied to the inlet end portion 34 will pass downwardly through the bleed line 40 and into the lower portion of the compartment 22 so as to displace the gas (atmosphere) disposed above the liquid within the compartment 22 outwardly therefrom and into the upper portion of the compartment 24 above the liquid 58 therein to be dispensed therefrom. As the gas pressure rises in the upper portion of the compartment 24, the liquid 58 within the lower portion of the compartment 24 is discharged therefrom through the feed line 44 and into the fitting 42 through the orifice 46.

The flow restricting disk 50 within the flow line 32 insures that a portion of the liquid under pressure supplied to the inlet end portion 34 of the flow line 32 will be bled therefrom through the bleed line 40 and into the compartment 22.

The necks 48 and 52 provide ready access to the orifice 46 and the flow restricting disk 50, whereby the fluid flow rating of each may be varied as desired in order to modify the proportion rate at which liquid 58 from the compartment 24 will be dispensed therefrom into the outlet end portion 36 of the flow line 32.

When it is desired to recharge the proportioner 10, a new supply of liquid 58 may be admitted into the compartment 24 and the liquid accumulated within the compartment 22 may be drained therefrom through the valved outlet 54. Further, it will be noted that the container 12 is constructed of non-corrosive material and that the lines 32, 40 and 44 are also constructed of corrosion resistant materials.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A closed hollow pressure container, said container including means dividing the interior of said container into a pair of first and second closed compartments, gas transfer means communicating upper portions of said compartments for the transfer of gas under pressure from an upper portion of said first compartment into the upper portion of said second compartment, a liquid pressure flow line supported from said ocntainer in elevated position relative to the upper extremity of said container, said flow line including inlet and outlet end portions to which the discharge and inlet ends of supply and discharge lines, respectively, may be removably coupled, flow reducing means in said line intermediate its inlet and outlet end portions, a restrictive flow bleed line communicating said flowline, upstream from said flow reducing means, with the lower portion of the interior of said first compartment adjacent the bottom thereof and a proportioned liquid feed line communicating the lower portion of said second compartment with said flow line downstream from said flow reducing means, said second compartment being adapted to receive a liquid therein to be proportionally fed into said flow line, said container including a valved drain outlet opening into a lower portion of said one chamber, the upper end of said container including a filler opening through which liquid to be proportionally fed into said flow line may be admitted into said other compartment, and a removable closure for said filler opening.

2. The combination of claim 1 wherein said pressure container is generally cylindrical in configuration, said means dividing the interior of said container comprising a partial cylindrical partition secured within said container and extending between the opposite sides and ends thereof, the convex side of said partition facing into said one compartment.

* * * * *